United States Patent [19]

Shimizu

[11] Patent Number: 5,852,679
[45] Date of Patent: *Dec. 22, 1998

[54] IMAGE PROCESSING APPARATUS AND METHOD

[75] Inventor: Haruo Shimizu, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 522,916

[22] Filed: Sep. 1, 1995

[30] Foreign Application Priority Data

Sep. 2, 1994 [JP] Japan ................................ 6-210254

[51] Int. Cl.$^6$ .................................................... G06K 9/00
[52] U.S. Cl. ............................................ 382/180; 358/458
[58] Field of Search ................................ 395/102, 109; 382/180, 167; 358/521, 523, 530, 458

[56] References Cited

U.S. PATENT DOCUMENTS

| | | | |
|---|---|---|---|
| 4,855,765 | 8/1989 | Suzuki et al. | 346/154 |
| 5,138,443 | 8/1992 | Ikeda et al. | 358/80 |
| 5,251,023 | 10/1993 | Arimoto et al. | 358/529 |
| 5,315,691 | 5/1994 | Sumiya et al. | 395/109 |
| 5,329,616 | 7/1994 | Silverbrook | 382/233 |
| 5,457,772 | 10/1995 | Shannon | 395/109 |
| 5,461,703 | 10/1995 | Goyins et al. | 395/109 |
| 5,463,720 | 10/1995 | Granger | 395/109 |
| 5,465,165 | 11/1995 | Tanio et al. | 395/109 |
| 5,485,529 | 1/1996 | Kurita et al. | 358/500 |
| 5,487,137 | 1/1996 | Matsuhira | 395/109 |
| 5,555,093 | 9/1996 | Nagashima | 358/296 |

FOREIGN PATENT DOCUMENTS

| | | | |
|---|---|---|---|
| 0344976 | 6/1989 | European Pat. Off. | H04N 1/387 |
| 3021173 | 1/1991 | Japan | H04N 5/278 |

OTHER PUBLICATIONS

"Unda: First of a New Generation of Color Systems", Seybold Report On Publishing Systems, vol. 19, No. 3, pp. 1–24, 9OCT89, USA ISSN: 0763–2260.

"Unda: First of a New Generation of Color Systems", Seybold Report On Publishing Systems, vol. 19, No. 3, pp. 1–24, 9OCT89, USA ISSN: 0736–7260.

"Procedural Elements For Computer Graphics", David F. Rogers, McGraw–Hill Book Company, pp. 29–51.

Primary Examiner—Yon Couso
Attorney, Agent, or Firm—Fitzpatrick, Cella, Harper & Scinto

[57] ABSTRACT

An image processor realizes a gradation function and prints and records color information sent from a host computer, as a high-definition and multi-halftone level image. The processor fetches PDL data into an input buffer by interrupt processing, and interprets an input PDL command in accordance with language specifications. If the input data is a drawing command, the input data is converted into a page object format supported by a hardware renderer. Subsequently, as pre-processing for rendering the page object, a determination is made if banding rendering (banding) processing is possible.

15 Claims, 18 Drawing Sheets

FIG. 6

| | |
|---|---|
| LINE grad_mode | % GRADATION OF LINE PATTERN |
| gray grad_color | % EXECUTE GRAY LEVEL GRADATION |
| 10 tone | % DIVIDE INTO 10 EQUAL-DENSITY SECTIONS |
| | % UPON GRADATION |
| 0 0 100 100 100 200 grad_pt | |
| | % DEFINE GRADATION PATTERN OF |
| | % DENSITY 100 FOR ( 0, 0) AND GRADATION |
| | % PATTERN OF DENSITY 200 FOR (100, 100) |
| 10 10 moveto | % MOVE CURRENT POSITION TO (10, 10) |
| 100 100 lineto | % SET CURRENT POINT AT POINT (100, 100) |
| stroke | % EXECUTE ACTUAL LINE DRAWING |
| TRIANGLE grad_mode | % GRADATION OF TRIANGLE PATTERN |
| 20 tone | % DIVIDE INTO 20 EQUAL-DENSITY SECTIONS |
| | % UPON GRADATION |
| 100 0 100 0 100 200 100 100 200 grad_pt | |
| | % DEFINE GRADATION PATTERN OF |
| | % DENSITY 100 FOR (100, 0) AND GRADATION |
| | % PATTERN OF DENSITY 200 FOR (100, 100) |

INPUT DATA

| 180 | 60 | 100 | 125 |
|-----|-----|-----|-----|
| 155 | 130 | 60 | 115 |
| 128 | 190 | 90 | 203 |
| 106 | 80 | 87 | 77 |

PIXEL OF INTEREST

DITHER MATRIX
(EACH ELEMENT DOES NOT EXCEED 255/3)

| 74 | 53 | 32 | 80 |
|----|----|----|----|
| 23 | 5  | 11 | 58 |
| 45 | 21 | 16 | 37 |
| 65 | 43 | 64 | 85 |

PIXEL OF INTEREST

F I G. 22

|  | 2 BIT INFORMATION | | | | | | | | |
|---|---|---|---|---|---|---|---|---|---|
| 0 INPUT | 0, 0 | 0, 1 | 0, 2 | 0, 3 | 1;0... | 3, 0 | 3, 1 | 3, 2 | 3, 3 |
| ⋮ | ⋮ | | | | ⋮ | | | | |
| 255 INPUT | 0, 0 | 0, 1 | 0, 2 | 0, 3 | 1;0... | 3, 0 | 3, 1 | 3, 2 | 3, 3 |

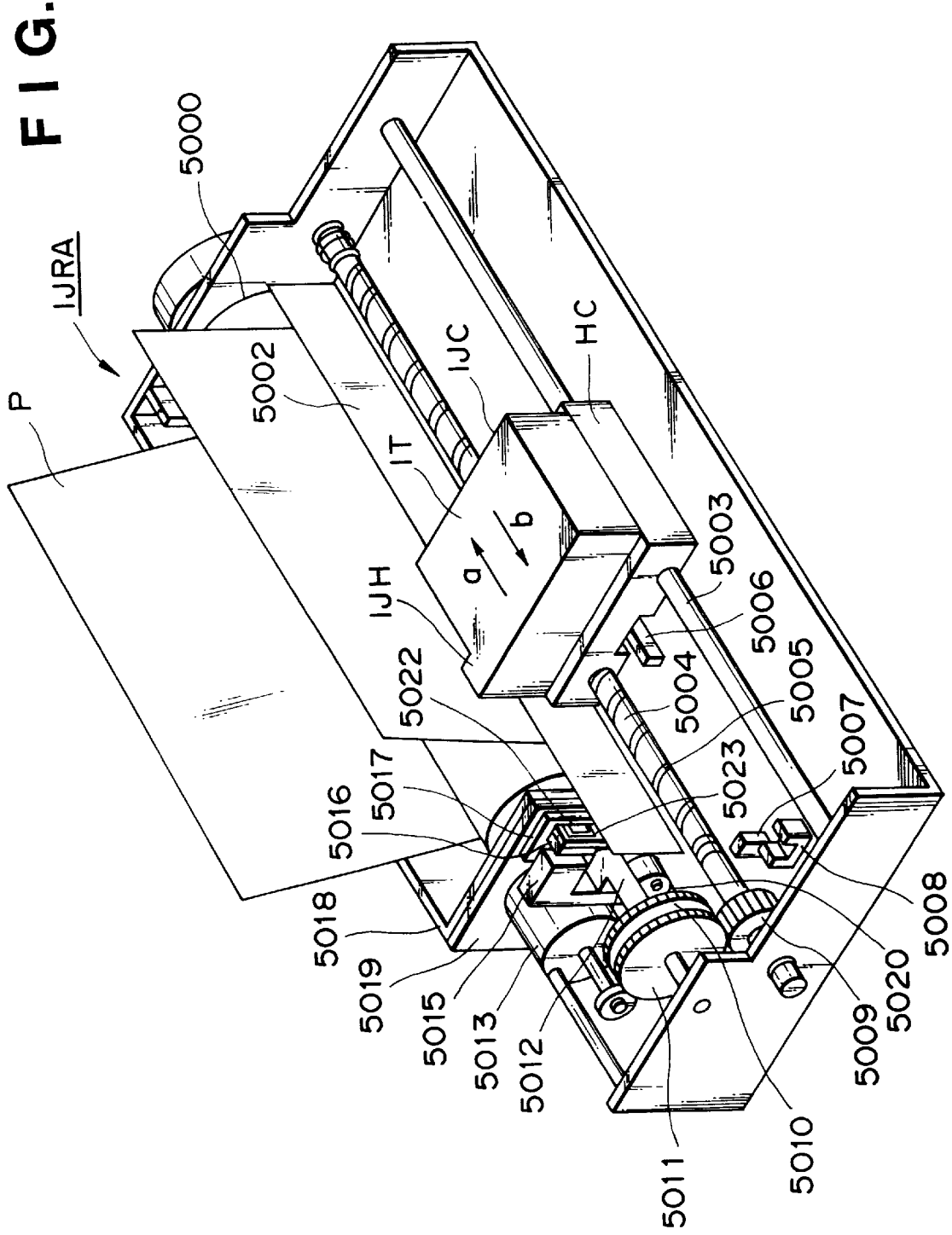

IMAGE PROCESSING APPARATUS AND METHOD

BACKGROUND OF THE INVENTION

1. Field of the Invention

The present invention relates to a color printing apparatus and method for processing color information in the field of, for example, color DTP.

2. Related Background Art

In recent years, the advent of high-performance workstations and personal computers has provided an environment that allows users to easily handle characters, figures, and image data in full color. As a result, color information is utilized in a variety of fields such as documents, OHP data, slide data, arts, designs and the like. More specifically, applications using color information on the host computer are utilized in a wide range applications.

However, upon recording color information created by the host computer using a printing apparatus, a dumb printer or video printer is normally utilized. The host computer develops character, image, and figure data for an image in correspondence with the resolution of a recording apparatus by utilizing the power of the CPU, and supplies the developed image to a color printer. This system is characterized in that the mechanism of the printer is simplified, and the host computer executes many processing operations. However, when color information is processed, a significant communication time is required due to the large data volume, thus considerably impairing throughput of data communication.

On the other hand, monochrome printers normally adopt the page description language (to be simply abbreviated as PDL hereinafter) system. In this system, the host computer supplies character figure, and image data as PDL codes, and the printer interprets the PDL codes and scan-converts various kinds of information into a raster page memory corresponding to the resolution of a recording apparatus to be used, thereby generating a page image. In recent years, the above-mentioned system is applied to color printers, and color PDL printers have become popular.

The products as color PDL printers are divided into low- and high-price color printers. A low-price color printer represented by ink-jet printers, thermal transfer printers, and the like and has 1-bit page memories in correspondence with four colors, i.e., Y, M, C, and K colors. Upon reproduction of color images or characters or upon painting using a designated color, such a color printer normally reproduces pseudo halftone colors at the cost of resolution by the dither method (basically) or the error diffusion method (when color accuracy is required).

On the other hand, a high-price color printer represented by a color LBP (laser beam printer) or the like can express a plurality of halftone/density levels (e.g., 256 gradation levels per color) in each of Y, M, C, and K colors in one pixel. Such a printing apparatus holds a designated color therein and supplies it to a printer engine without requiring the above-mentioned pseudo halftone processing.

Recently, applications that utilize a gradation function (for performing rendering while gradually interpolating between designated colors) or the like have become popular as attempts to accurately express colors in the design and graphics fields. An image printer can easily cope with an image generated by the gradation function. However, in a PDL printer, a gradation function is not provided as a command which is innate in a PDL, since typical PDLs (e.g., Post Script, PCL, and LIPS) do not support this function, a CPU of the printer does not have sufficient power, and so on.

For this reason, the PDL printer prints a gradation portion as an image or prints the same color regions in the gradation portions in predetermined colors as polygons. As a result, the amount of communication between the host computer and the printer increases, and the advantage to be provided by the PDL printer cannot be fully utilized.

SUMMARY OF THE INVENTION

The present invention has been made in consideration of the above situation, and has as its object to provide an image forming apparatus and method, which can print or record color information supplied from a host computer at high speed as a high-definition and multi-halftone level image by realizing the gradation function in a printer.

In order to achieve the above object, according to the present invention, there is provided an image processing apparatus for an image forming apparatus which forms an image on the basis of color page-description information input from an external apparatus, including:

input means for inputting the color page-description information from the external apparatus, the information representing the image and including gradation information which instructs generation of a gradation image;

intermediate information generation means for generating predetermined intermediate information on the basis of the color page-description information;

interpretation means for interpreting the gradation information; and rendering means for rendering the image which includes the gradation image, on the basis of the intermediate information and the interpretation result.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view showing an example of gradation commands;

FIG. 22 is a view showing the dither table pointed to by the pointer; and

FIG. 23 is a perspective view showing the outer appearance of a color recording apparatus.

DETAILED DESCRIPTION OF THE PREFERRED EMBODIMENTS

The preferred embodiments of the present invention are described in detail below with reference to the accompanying drawings.

Figure 1:
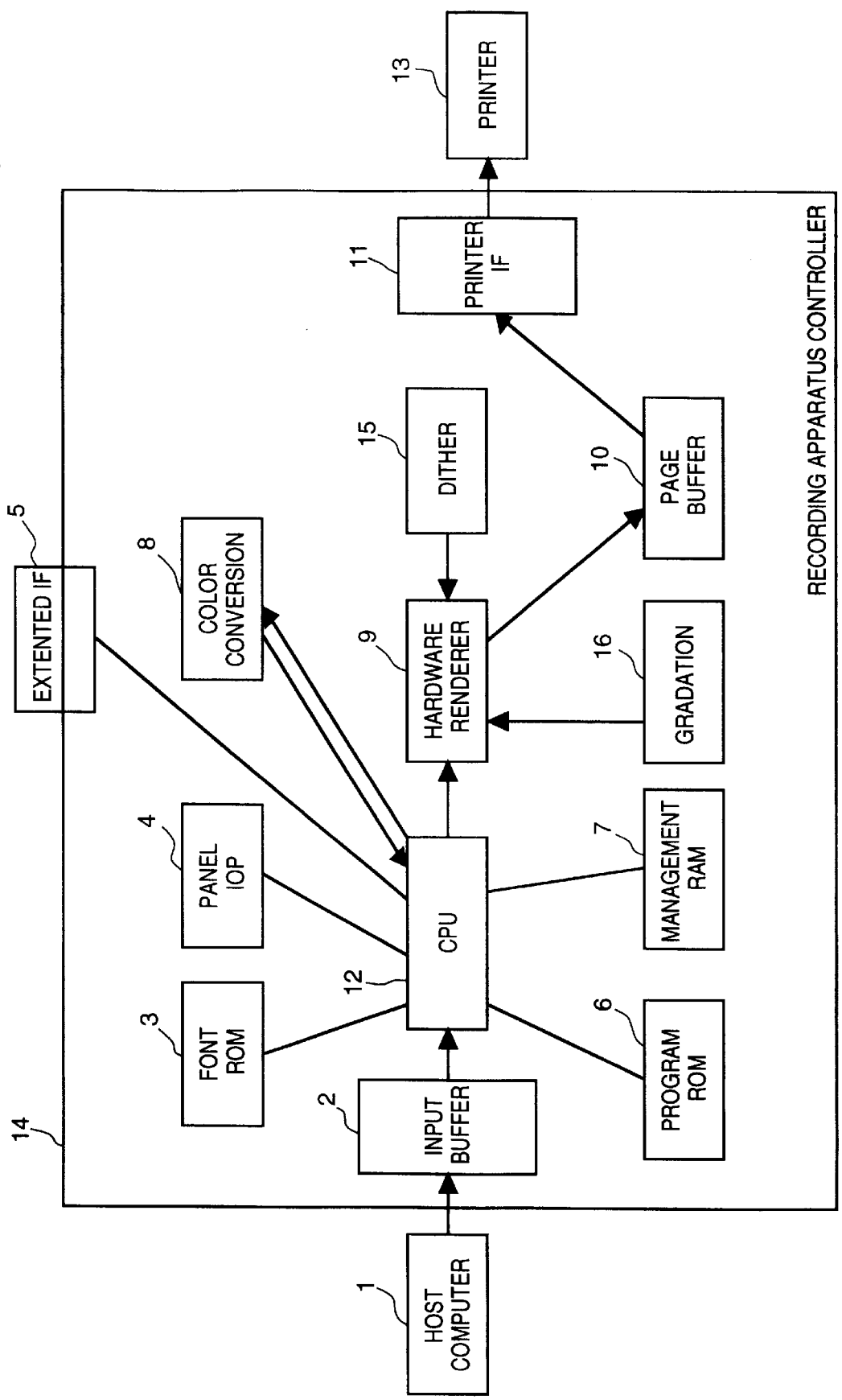
FIG. 1 is a block diagram showing the basic arrangement of a color printing apparatus according to an embodiment of the present invention.

FIG. 1 is a block diagram showing the basic arrangement of a color printing apparatus (to be referred to as an apparatus hereinafter) according to an embodiment of the present invention. The general flow of processing in the apparatus of this embodiment is described below with reference to FIG. 1.

[Description of Overall Arrangement]

Referring to FIG. 1, reference numeral 1 denotes a workstation WS (host computer) which generates color information as a color application, converts corresponding color data into a PDL format, and supplies the converted data to a recording apparatus controller 14. In this case, PDL data flows between the host computer 1 and the recording apparatus controller 14. As a configuration of the communication, a serial communication, a network communication, a bus connection, and the like may be adopted. For this communication, a high-speed communication line is preferable in terms of performance.

Color PDL data supplied to the recording apparatus controller 14 is stored in an input buffer 2, and the input data is scanned by a PDL command-interpretation program stored in a program ROM 6. Reference numeral 3 denotes a font ROM for storing bit pattern or outline information of characters, character base-line information and character metric information. The font ROM 3 is utilized upon printing of characters. A panel IOP 4 comprises an I/O processor and firmware for controlling detection of switch inputs and display of a LCD on a panel attached to a printer main body, and utilizes an inexpensive CPU.

An extended I/F 5 is an interface circuit with extended modules (the font ROM, the program ROM a RAM, and a hard disk) of the printer. The ROM 6 stores a control software program of the apparatus according to this embodiment. A CPU 12 reads the program data stored in the ROM 6, and executes predetermined processing. A management RAM 7 provides a management area for a software program, and stores data obtained by examining input PDL data and convert the data into an intermediate data format (page object), global information and the like.

A color-conversion hardware block 8 performs conversion from the RGB, calorimetric system which employs additive color mixing, normally utilized by a monitor in the host computer into the YMCK system, which employs subtractive color mixing, used in ink processing of the printer. This processing requires high arithmetic power such as nonlinear log conversion, 3×3 matrix arithmetic operation, and the like, when pursuing precise color, and high-speed processing is realized by using a look-up table in terms of hardware.

The parameters of the look-up table are adjusted to optimal ones for the printer engine. However, when the host computer side issues a request for changing the color conversion system, the color conversion algorithm is modified to a user-defined one by changing the table values. On the other hand, at the cost of the processing time, the above-mentioned processing may be realized by arithmetical software processing by the CPU 12.

A hardware renderer 9 performs rendering processing in real time in synchronism with the video transfer timing of a printer (LBP) 13 by executing color rendering processing using ASIC (application specific integrated circuit) hardware, thereby realizing banding processing with a small memory capacity. A page buffer 10 provides an area for storing an image developed based on PDL data, and has a memory capacity of at least two bands as shown in the following equation, for executing the above-mentioned banding processing.

page width * band height of about 256 or 512 * 3 (RGB) or 4 (YMCK) as the number of planes * bit depth * 2 as the number of bands In an apparatus such as an LBP which cannot execute banding processing since it must transfer an image in synchronism with a printer engine, a full-color bit map memory which lowers or decreases the resolution and/or the number of color halftone levels must be assured. On the other hand, in an apparatus such as a bubble-jet printer (to be abbreviated as BJ hereinafter) in which the head movement can be controlled by a controller, the memory capacity corresponding to at least two bands as described above may be required.

A dither pattern block 15 is utilized for executing a high-speed printing operation with a small memory capacity by using the banding processing or for reproducing color accuracy with a small bit-depth in degrade processing, in which a forcible printing operation is performed halfway along a page when print data which cannot be image-developed in real time is present in a given band or when a page object overflows the management RAM 7. In other words, the dither pattern block 15 is basically used when the depth of the page (band) memory is small relative to the color depth of an object.

A gradation processing block 16 serves as the core of the apparatus according to of this embodiment, and corresponds to software or hardware for interpreting a gradation command included in PDL data supplied from the host computer 1 and generating corresponding background information (to be described later). Since this processing is very CPU-intensive processing, processing using hardware is preferable to obtain high performance.

A printer interface 11 transfers the contents of the page buffer 10 as video information to the color printer 13 (e.g., an LBP) in synchronism with the horizontal and vertical synchronization signals of the printer, and also performs head control in the BJ and transfer of video information in correspondence with the head size for a plurality of lines. The printer interface 11 transmits commands to the printer 13 and receives status information from the printer 13.

The CPU 12 is a central processing unit which controls the entire processing of the recording apparatus controller 14. The printer 13 comprises a color printer for printing a video signal supplied from the recording apparatus controller 14. Note that the printer 13 may comprise either a color LBP based on the electrophotography system or an ink-jet printer.

Figure 2:
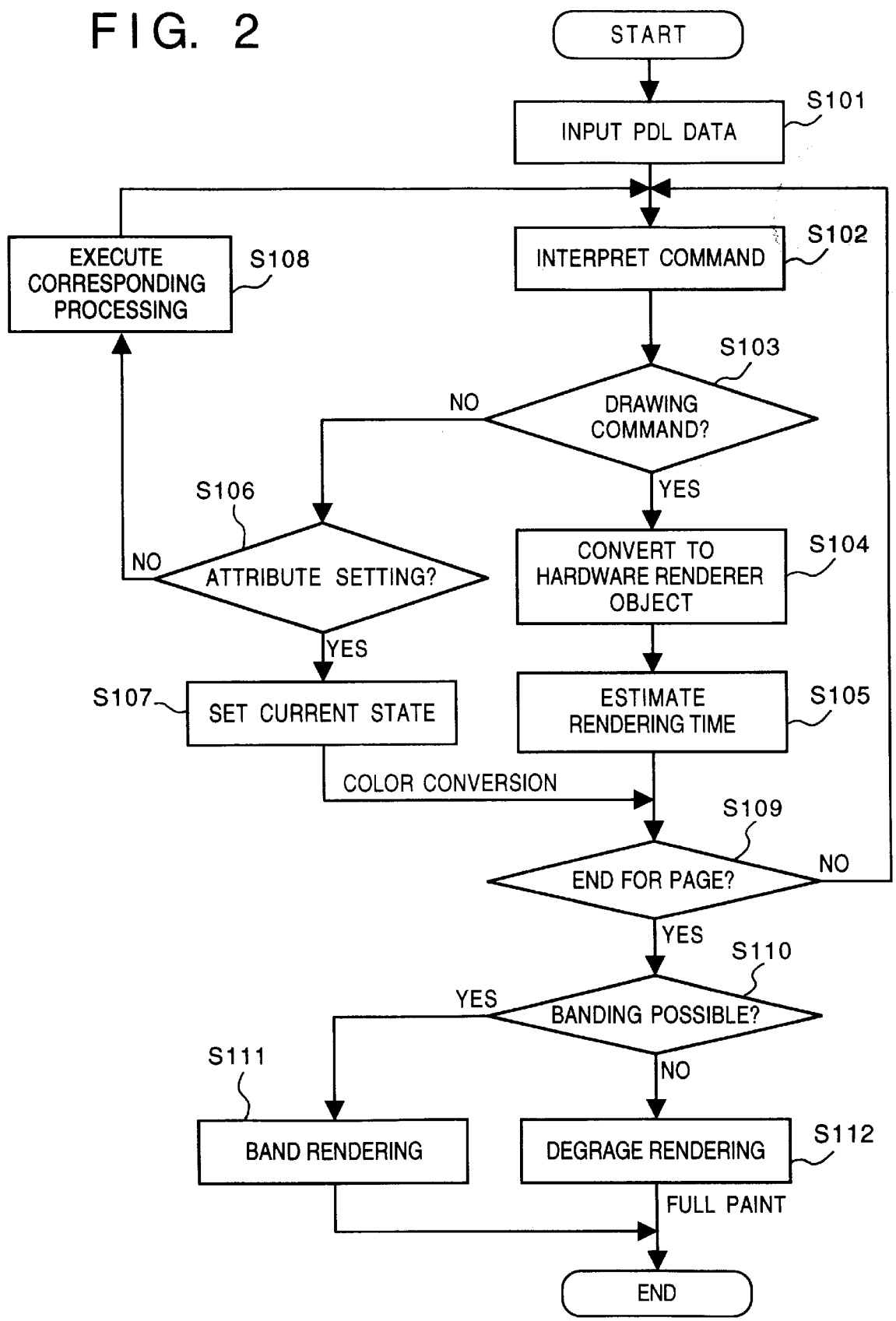
FIG. 2 is a flow chart showing the processing sequence of various kinds of drawing information from a host computer to a printer.

The flow of various kinds of drawing information from the host computer 1 to the printer 13 is described below. FIG. 2 is a flow chart showing the processing sequence of various kinds of drawing information from the host computer to the printer in this embodiment.

[Algorithm]

In step S101 in FIG. 2, PDL data is stored in the input buffer 2 by, e.g., interrupt processing. In step S102, an input PDL command is interpreted in correspondence with the language specification. As a result of interpretation, if the input data is a drawing command for drawing, e.g., a character, a straight line, or an image, the input data is converted into a page object format (intermediate information) supported by the hardware renderer 9 as a hardware (or software) rendering circuit and the converted data is stored in the management RAM 7 in step S104.

[Rendering Model]

Figure 3:
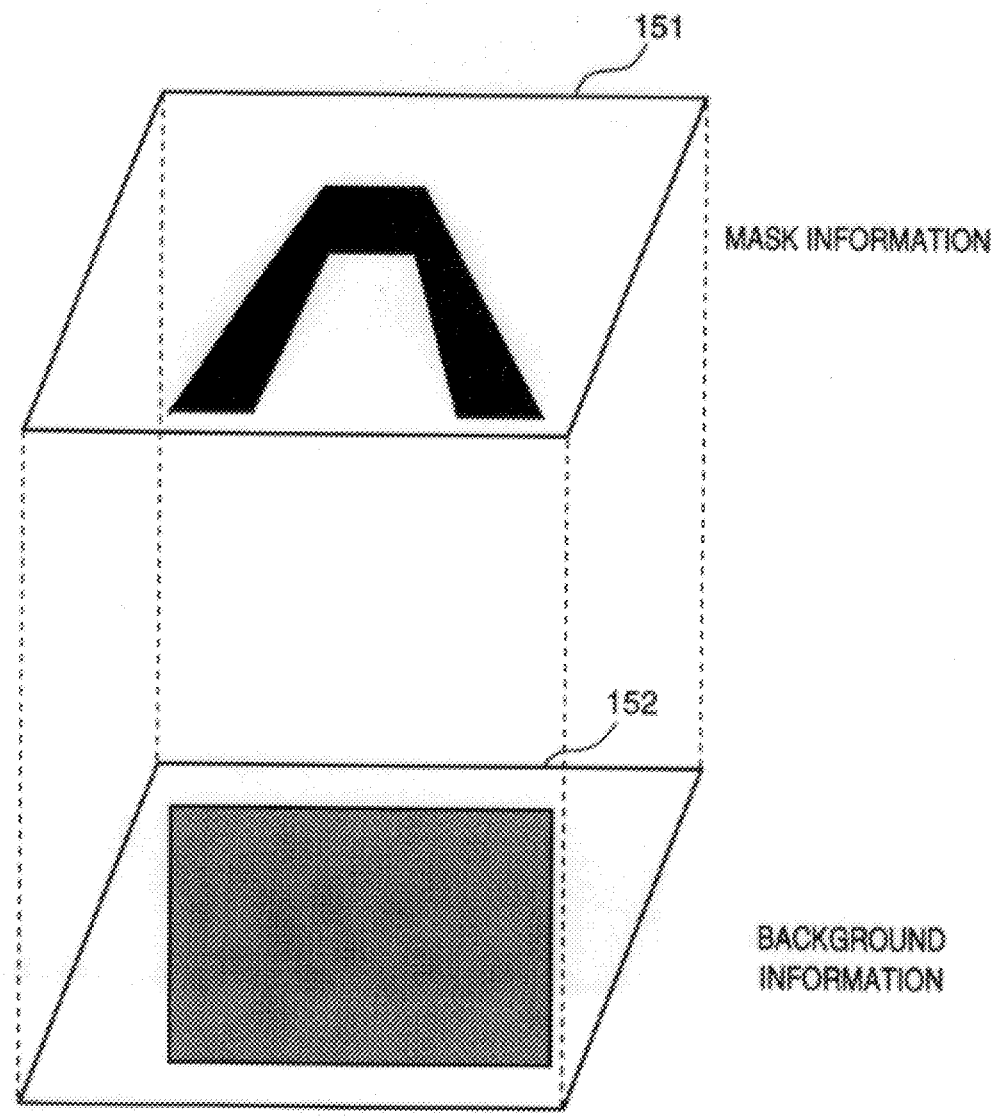
FIG. 3 is a view showing a rendering model in the embodiment shown in FIG. 1.

A rendering model according to this embodiment is briefly described below with reference to FIG. 3.

This model is constituted by three elements, such as mask information 151 which represents the geometric information of various drawing data, i.e., the position of a drawing object, and can be expressed by one bit (ON or OFF), color multi-value background information 152 which designates a color for painting a mask, and a logic drawing method (SET, OR, XOR, BLEND, ADD, or the like). FIG. 5B shows the rendering result.

[Gradation]

Figure 4A:
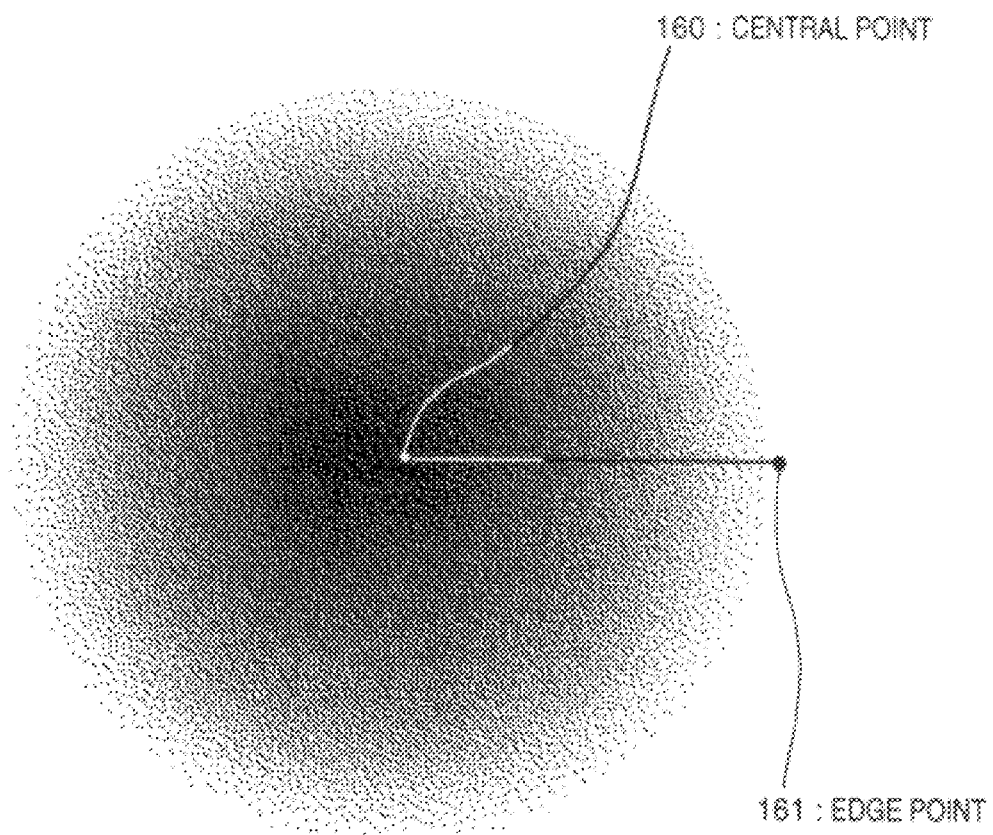
FIGS. 4A and 4B are views showing an example of gradation patterns.
Figure 4B:
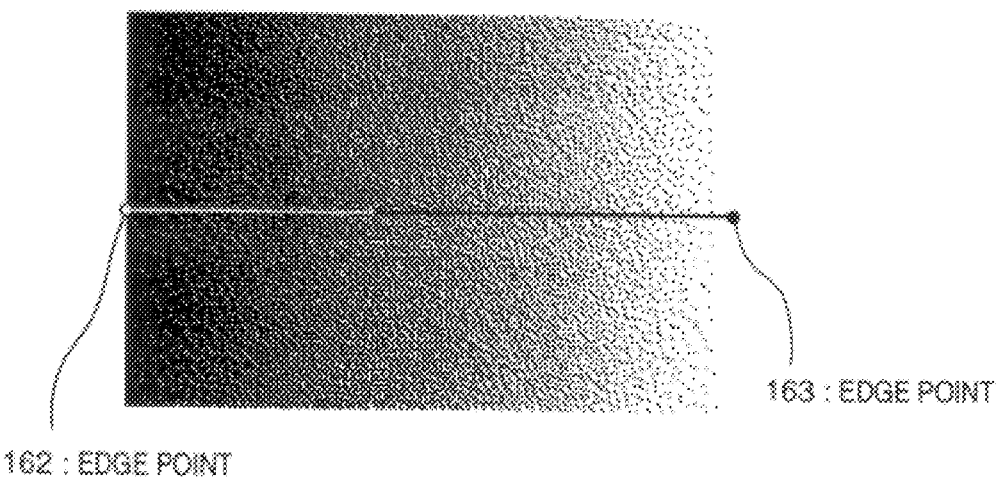

Background information includes a multi-value color image utilized in a normal DTP, a multi-value color pattern including a repetitive pattern, and a gradation pattern according to this embodiment. As an example of gradation processing, based on two geometric positions and the color density values at these points shown in FIGS. 4A and 4B, the density values are interpolated as a background pattern as follows:

(1) interpolation of the density in a direction perpendicular to a straight line connecting the two points (162, 163) (FIG. 4B).

(2) interpolation of the density in a concentric pattern from one point (160) as the center toward the other point (161) (FIG. 4A).

When three points are designated, a method of linear interpolation between these three points must be taken into consideration.

Figure 5A:
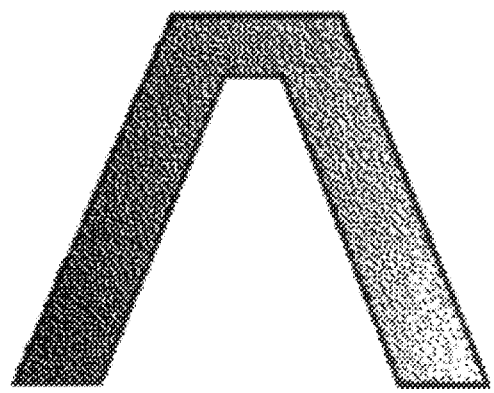
FIGS. 5A and 5B are views showing some rendering results.
Figure 5B:
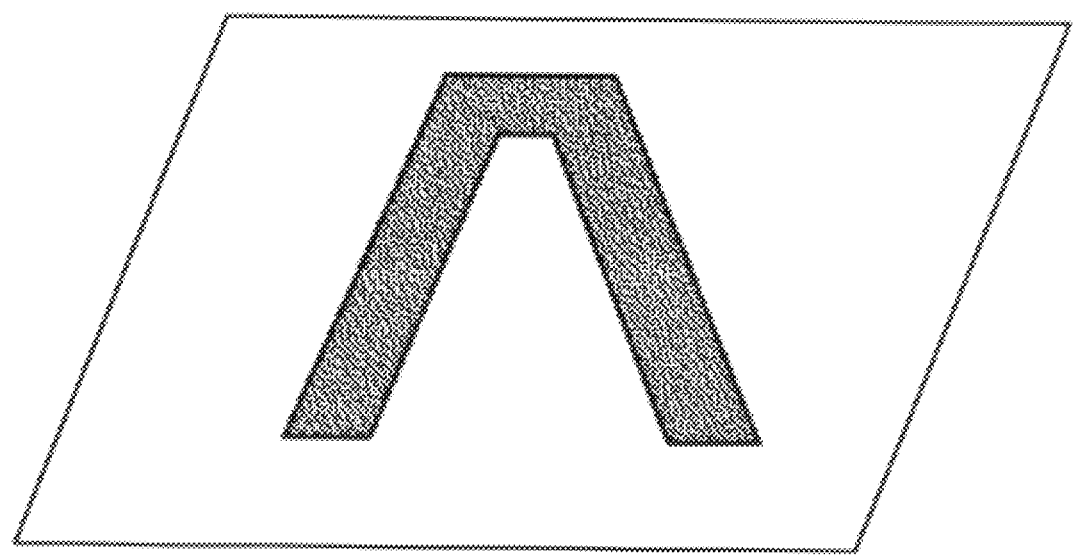

Only a portion corresponding to the mask information 151 of the background pattern shown in FIG. 4B generated by the above-mentioned gradation function is printed, thus obtaining the rendering result shown in FIG. 5A.

Such gradation information is supplied as, e.g., a stack language shown in FIG. 6 from the host computer 1 to the recording apparatus controller 14 on the basis of PDL data. In FIG. 6, a character string after symbol "%" represents a comment for a corresponding command. The commands shown in FIG. 6 represent gray data. However, these commands can be extended to represent color information by designating R, G and B components.

Upon clipping in an arbitrary shape, shape data (mask information) is clipped, and after clipping, only the remaining region is used as a mask. FIG. 5B shows an image as a result of rendering.

[Mask]

Figure 7:
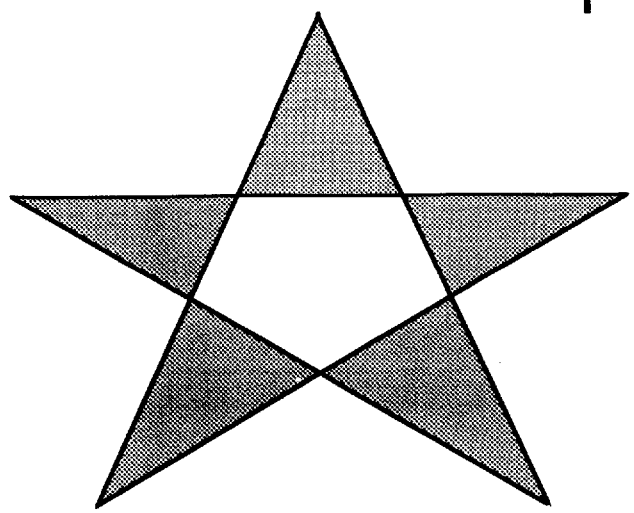
FIG. 7 is a view showing mask information.
Figure 8:
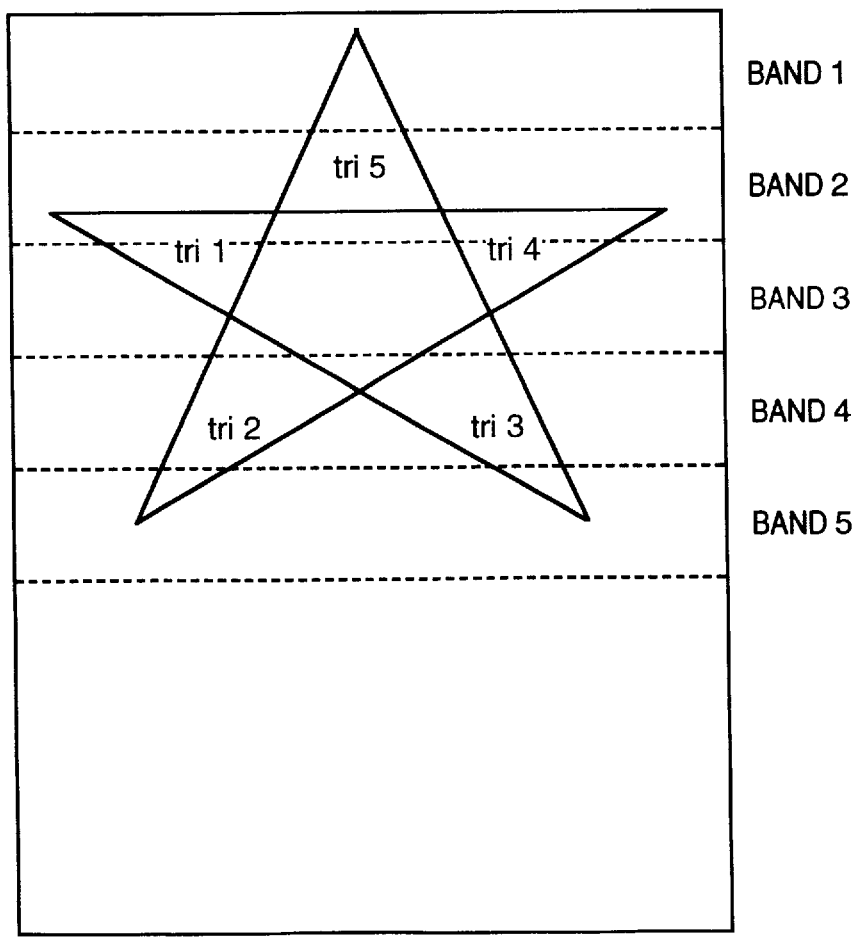
FIG. 8 is a view showing the relationship between mask information and bands.

Mask information supported in this embodiment consists of a run length (one scan line in the X direction), a convex polygon whose edges do not cross each other, a bit map image and a bit map font. As can be seen from such information, the mask information has a structure suitable for high-speed hardware rendering. For example, in step S104 in FIG. 2, a pentagon shown in FIG. 7 is divided into five triangles (tri1 to tri5) which do not cross each other, as shown in FIG. 8. Note that painting in this example adopts the even-odd rule.

Figure 9:
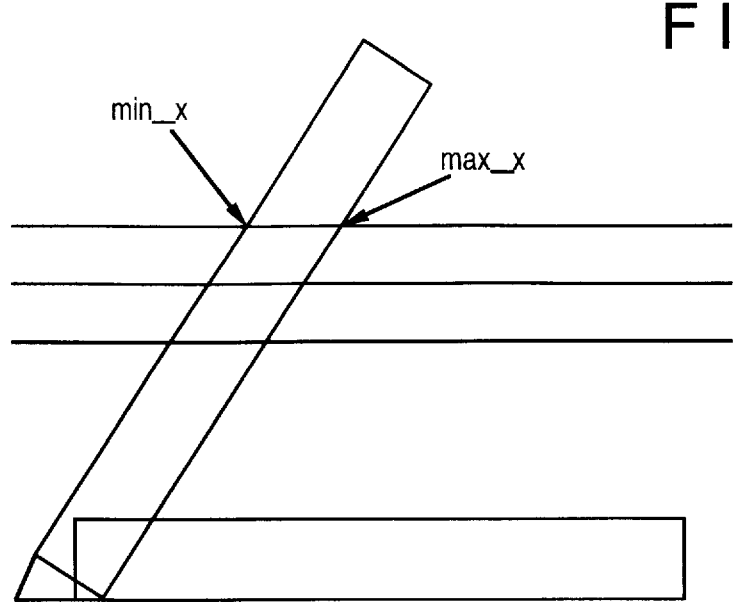
FIG. 9 is a view used for describing a line connection processing portion.

On the other hand, in a connection processing portion of a line shown in FIG. 9, a DDA algorithm is used to develop data in the work area in the management RAM 7, in consideration of connection information (round, miter, triangle) of a line, and a final external shape is held in a run length format as pair information of min x and max x in units of Y scan lines, thus preparing for the subsequent high-speed rendering.

Figure 10:
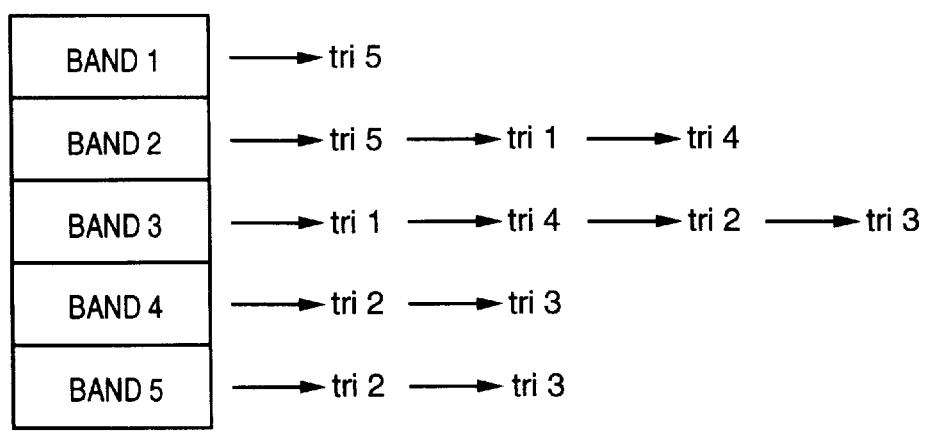
FIG. 10 is a view showing the link lists in the respective bands.

Finally-generated mask objects divide the page memory into a plurality of bands for performing banding, i.e., rendering with a memory capacity smaller than that of a full-page memory. The height of each band is preferably a power of 2 and is optimally set to be about 512 dots. The mask objects are sorted in units of bands, and a link list shown in FIG. 10 is formed in each band.

In this case, as for mask information (e.g., polygons shown in FIG. 8) extending over a plurality of bands, polygon information is shared by the respective bands. For a mask divided into bands, in step S105 in FIG. 2, the decode time and the rendering time of data required for rendering are added each time a page object is generated in each band. The time information is held as pred_decode(i), pred_render(i) in units of bands i.

The decode time is roughly proportional to data amount of each generated object. However, the decode times of triangles 1 and 4 in band 3 require extra time which is equal to time for calculating offsets of the start points of polygons in band 3 on the basis of the start points in band 2.

In the case of a normal background pattern, the rendering time is determined by:

The mask area in a band k color depth of background x the number of color planes x arithmetic factor depending on type of logic drawing In the case of a gradation background pattern, the rendering time is calculated by:

The mask area in a band×color depth of background x the number of color planes×arithmetic factor depending on type of logic drawing+generation time of gradation background pattern Note that generation of a gradation pattern requires an overhead larger than that required for a normal background pattern, which means an increase in the probability of degradation upon execution of software rendering.

Referring back to FIG. 2, if it is determined in step S103 that the input data is not a drawing command, it is checked in step S106 whether the data is a command for setting various attributes (background, logic drawing). If YES in step S106, processing of setting current state is executed in step S107. Note that the hardware (or software) renderer converts such commands into a readable data format (page object).

Since a command such as a Flood Fill (point designation painting) command cannot execute rendering in the banding mode, when such information is detected, a full paint flag (Full-p-lag) is set. As a result, the resolution and/or the number of halftone levels are forcibly decreased, and rendering is performed in the full paint (degrade) mode in step S112.

[Background]

Background information designates how to assign a color or density pattern to a mask. As the type of background, a background pattern for pasting an image to a mask without any repetition, a tile pattern for repetitively pasting a pattern on a mask in the vertical and horizontal directions, and a gradation pattern can be designated. Since this embodiment assumes a color printing apparatus, image tile, and gradation patterns can be designated as color information.

In step S108, damp processing of the current state is performed for the purpose of, e.g., debug processing. In step S109, the processing of an interpreter in the above step ends PDL command interpretation for one page. If YES in step S109, processing enters a rendering task to be described later. However, if NO in step S109, the flow returns to step S102 to repeat the next command interpretation.

The processing described so far basically corresponds to the data filing task from PDL data to a page object, and the subsequent processing corresponds to a rendering task for performing drawing on the page buffer 10. These tasks are installed as independent tasks on a real-time operating system since, in particular, the rendering task requires real-time processing. In addition, the rendering task is set and operated to have a higher operation priority than the data filing task.

[Band Rendering]

In step S110 in FIG. 2, as pre-processing for rendering a page object, it is checked if band rendering (banding) processing is possible.

The banding processing is impossible when:

(a) the above-mentioned Flood Fill command or the like is present in a page;

(b) information in the management RAM 7 overflows due to input of a large amount of image data (memory degrade); and (c) as for the rendering times prde_decode(i), prde_render(i) of each band calculated in step S105, some of the bands exceed a predetermined threshold value (time degrade) since the banding processing must execute processing of video signal transfer to the printer 13 and rendering to each band in parallel, once the color printer such as an electrophotography LBP, an LED printer, or the like performs a paper feed operation and starts recording.

When one of the above-mentioned conditions is satisfied, banding cannot be executed, the resolution and/or the number of halftone levels is decreased, and a full paint memory is assured in the memory of the page buffer 10. Thereafter, rendering is started.

On the other hand, in an apparatus such as a BJ printer which can control the head movement by a controlling side, the rendering time (time degradation as explained in the condition (c)) is not applied, and when the rendering speed is lowered, the banding processing can be executed by delaying the head movement in correspondence with the rendering speed.

Figure 11:
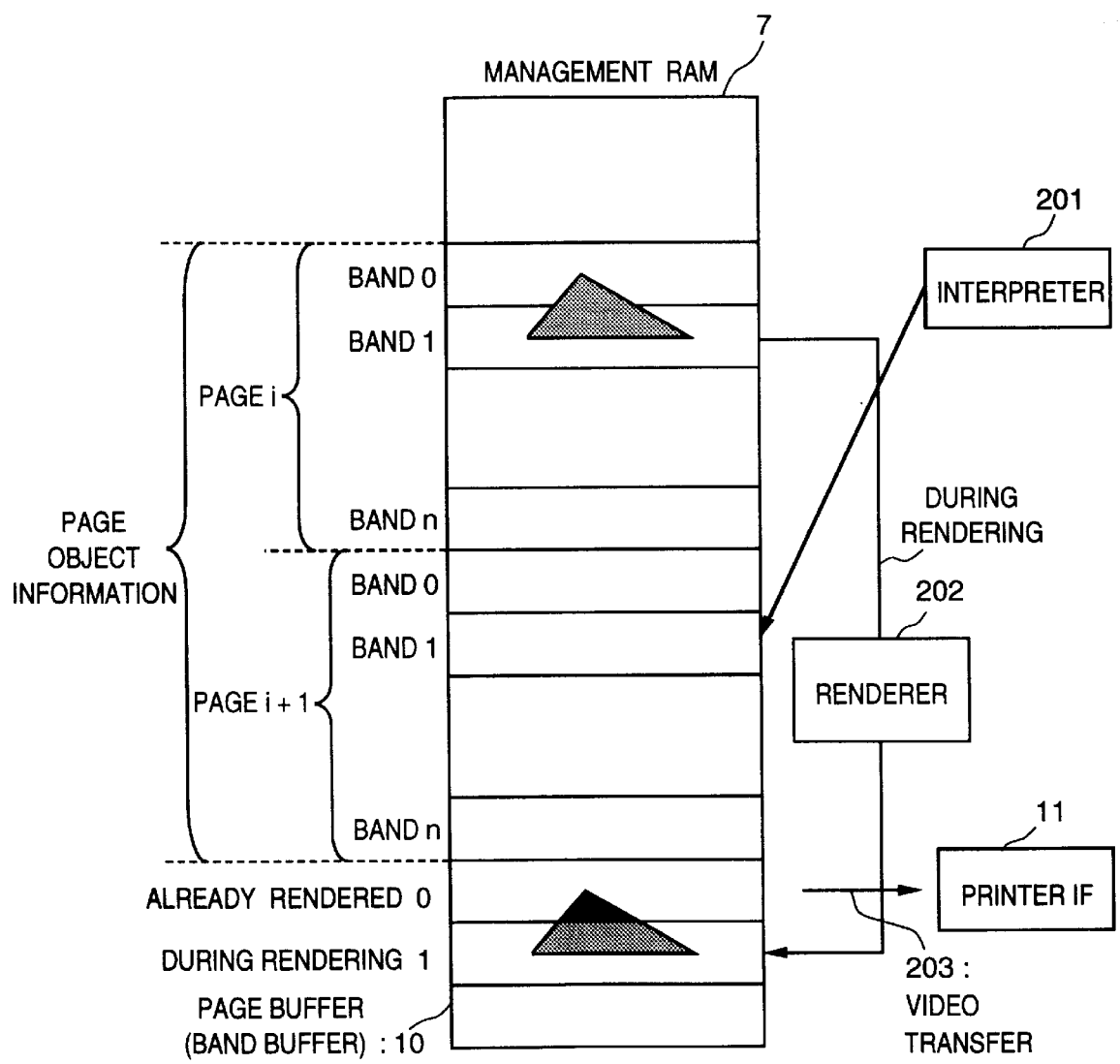
FIG. 11 is a view used for describing banding processing.

The banding processing is described below with reference to FIG. 11.

In the band rendering, the hardware or software renderer 9 activated by a rendering task 202 reads page object information generated in the management RAM 7 by a PDL interpretation task, and scan line information (x min, x max) along the Y-coordinate is extracted from mask information. Then, corresponding background information is written in the page buffer (band buffer) 10 with reference to current background information and the logic drawing mode. Y information is changed in correspondence with all the masks, and rendering is executed.

Since this embodiment assumes a color printer, four planes, i.e., Y, M, C, and K planes are present in the page buffer, and each color information is rendered in plane units.

Note that the logic drawing commands that can be supported by the hardware renderer 9 have the following three commands (d)–(f) when a source pattern is represented by "S" and a destination pattern is represented by "D".

(d) overwrite (D=S)

(e) transparency, not drawn on D (D=D if S=0, otherwise D=S)

(f) white (D=0)

These commands do not support processing that requires an arithmetic power for performing an arithmetic operation, such as inputting and calculating information related to both S and D and then setting the calculated result in D. This is because four color planes must be referred to, and the data amount for arithmetic operation becomes very large when each plane consists of 4 to 8 bits.

When background information is interpreted and data is stored in the management RAM 7 in step S107 in FIG. 2, the color conversion hardware block 8 converts R, G and B data supplied from the host computer into Y, M C, and K color data, and stores the converted data as background information. The color conversion may be realized in a software manner in place of the hardware block. However, the hardware block is preferably used to attain high-speed processing.

[Development of Gradation as Background Information]

Figure 12:
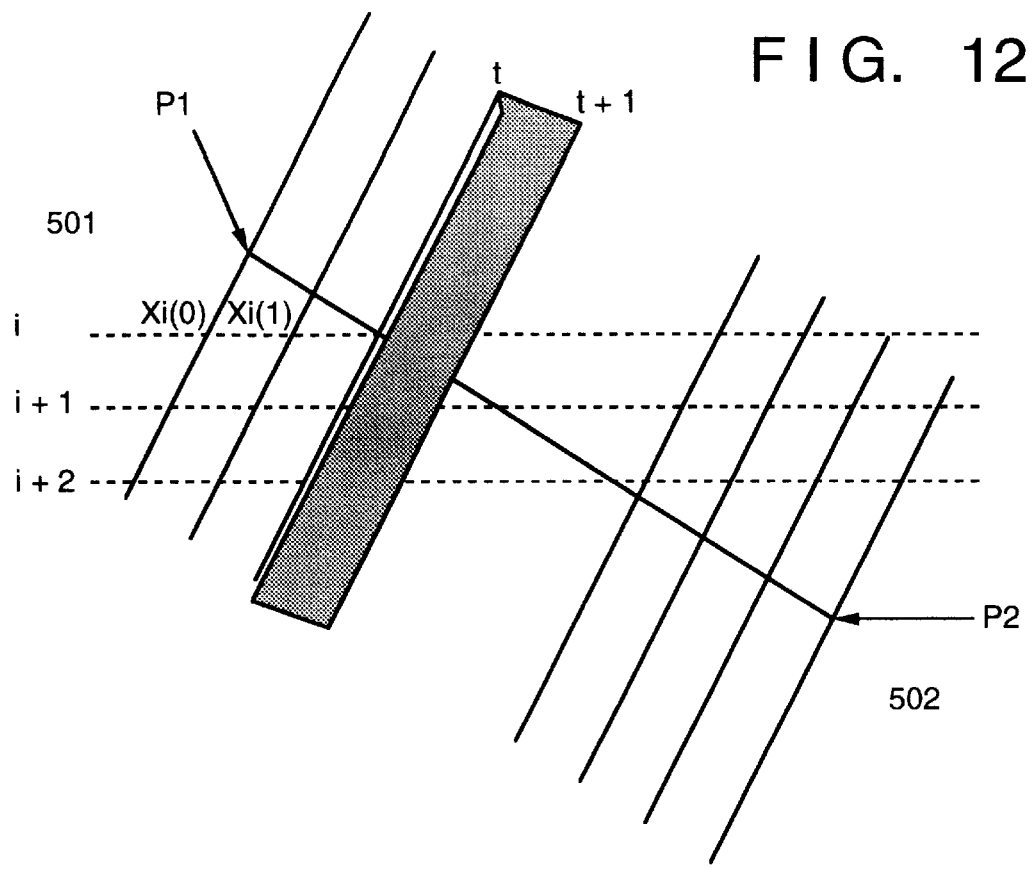
FIG. 12 is a view showing the principle of gradation processing.

When a gradation pattern is designated as a background pattern, the density calculation of a background portion corresponding to a mask must be executed by approximation. FIG. 12 is a view for explaining this density calculation. For the sake of simplicity, linear interpolation between two points is exemplified.

Upon rendering of various masks, the rendering results are stored in the page buffer in units of scan lines. As for gradation information, background information is generated in units of scan lines in synchronism with rendering.

Referring to FIG. 12, let P1(x1, y1) and P2(x2, y2) be the x- and y-coordinates of two points P1 (501) and P2 (502), and d1 and d2 be the color densities of the two points. In this case, a portion between the points P1 and P2 is equally divided into sections div in correspondence with an approximation-division unit (div) internally designated via PDL data. Thus, the density, D, of the t-th section from P1 is given by:

$$D=d1+(d2-d1)\times t/\text{div}$$

As a result, a portion painted in a halftone dot screen in FIG. 12 is expressed as a predetermined (color) density. As the div information is increased, i.e., each of the divided sections is made smaller, a finer gradation pattern is obtained, but at the same time the calculation time increases.

The algorithm for generating background information in units of scan lines is described below.

Let xi(0) be the x-coordinate of the intersection between a scan line i and an equal-density line at the point P1, and xi(1) be the x-coordinate of the intersection between the scan line; the next equal-density line. By applying the Bresenham's DDA algorithm based on these intersections, the intersections (xi+1(0) and xi+1(1)) between the next scan line i+1 and the equal-density lines is easily calculated from the slant of a line t.

When the positions of the point P1 and the next line are obtained with high precision on the sub-pixel level, the intersections onward between the equal-density lines and the subsequent scan lines can be respectively expressed as multiples of the distance between these two points. By filling a portion between each of those two points with an equal density, background information is finally generated. At this time, a portion whose coordinate value exceeds an effective print region is clipped out.

Upon filling the portion with equal densities, by utilizing difference information from the previous scan line, i.e., δx, generated upon an increment in y by one line, background information can be generated at high speed. The background information must be prepared for the amount of one-scan line assuming that the worst case may occur. However, all of the region is not always utilized.

In this embodiment, a calculation is made using one D (density information) as density. In the case of a color printer, the same processing must be executed for four colors, i.e., Y, M, C and K colors.

A concentric gradation pattern is described below.

Figure 13:
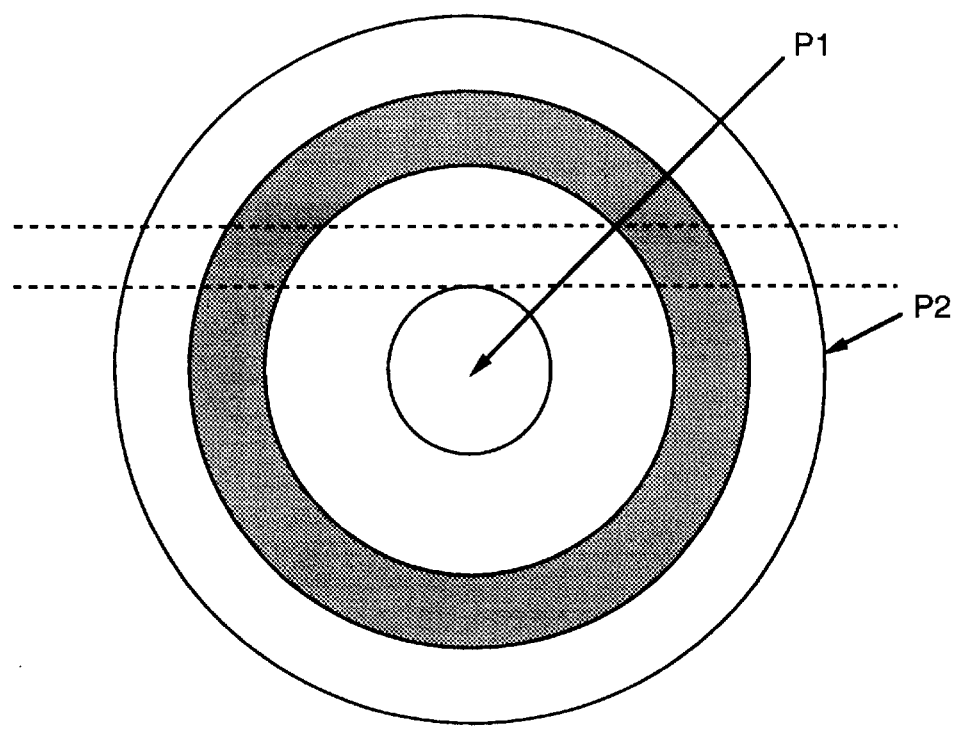
FIG. 13 is a view showing the principle of a concentric gradation pattern.
Figure 14:
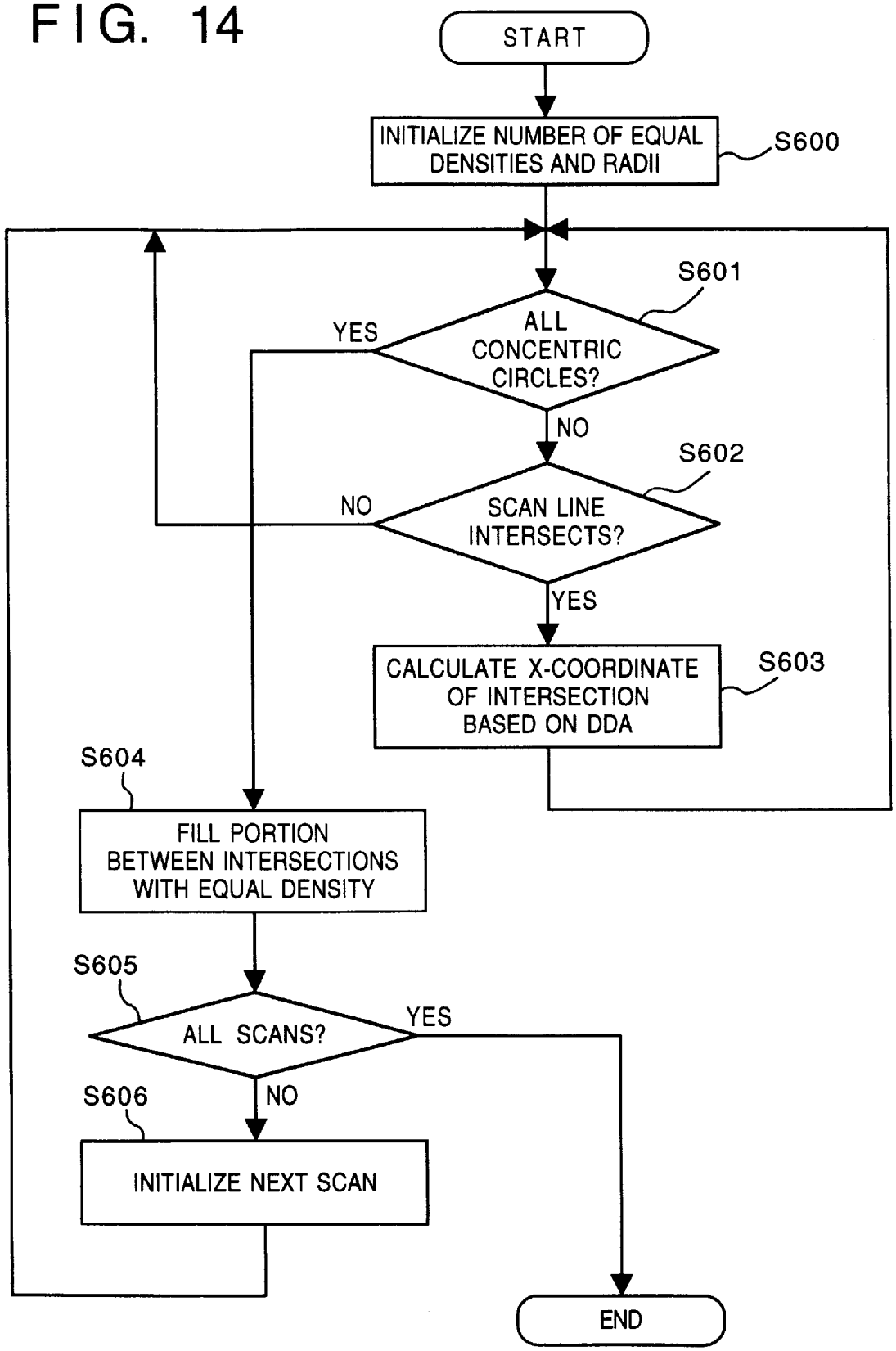
FIG. 14 is a flow chart showing the concentric gradation algorithm.

FIG. 13 is a view showing the principle of a concentric gradation pattern, and FIG. 14 is a flow chart showing the concentric gradation algorithm.

In step S600 in FIG. 14, from the number of divisions of circles designated by PDL data, steps of radii of the circles and equal density values to be filled are calculated. In the same manner as in a line, by utilizing the Bresenham's DDA algorithm (see DAVID, F. ROGERS, "PROCEDURAL ELEMENTS FOR COMPUTER GRAPHICS", McGraw-Hill), it is roughly checked if each concentric circle intersects a scan line, each time the Y scan line is updated by one (steps S601 and S602).

If it is determined that a concentric circle intersects the scan line, since a change in x-coordinate can be calculated in units of integers, a plurality of intersections can be calculated by applying the DDA algorithm to a plurality of concentric circles (step S603). Then, the section between each of two intersections is filled with a predetermined density (step S604).

The above-mentioned processing is applied to all the scans as the y-coordinate changes (step S605). If the processing is not completed for all the scans (NO in step S605), the next scan is initialized in step S606; otherwise, this processing ends.

Figure 15:
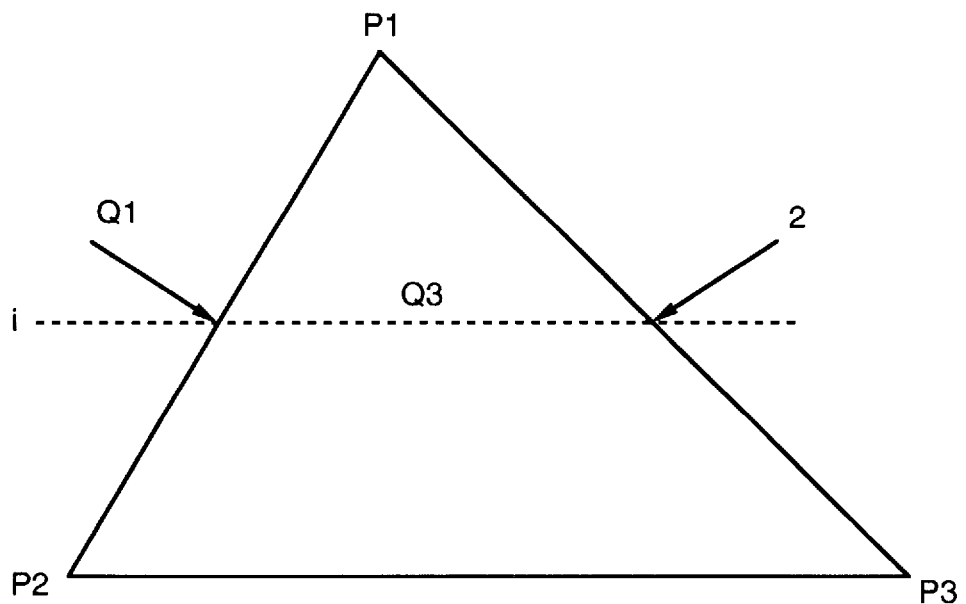
FIG. 15 is a view showing an example of a triangular gradation pattern.

FIG. 15 shows an example of a triangular gradation pattern. Let Q1 and Q2 be the intersections between the respective sides and a scan line i (the scan line i intersects only two sides), and D(Q1) be the density at the point Q1. The density D(P1) at the point P1 and the density, D(P2), at the point P2 are internally divided in correspondence with the ratio of distances. When D(Q1) and D(Q2) are obtained, the above-mentioned method of interpolating a portion between two points with a predetermined number of equal densities can be used, i.e., the above-mentioned algorithm can be utilized.

Note that information indicating one of the above-mentioned gradation processing modes is included in gradation information supplied from the host computer.
[Shipping in Banding]

In this manner, the hardware renderer 9 renders a page object of the band number i in accordance with mask information, background information, and the logic drawing method, and supplies, in parallel with the rendering, band information of the band number i−1, which has been already rendered, to the printer 13 as a color video signal (YMCK) via the printer IF 11, in synchronism with the horizontal synchronization signal supplied from the printer 13.

If the apparatus has no hardware block for processing the gradation function, the banding processing is hard to attain for a system such as an LBP which must perform rendering in real time. However, no problem is posed in a system such as a BJ, which has a sufficient margin upon shipping of video data even rendering speed is low.

The banding processing can be realized when the page buffer 10 has a work memory for holding data of:

$$256 \text{ (Y size)} * 4 \text{ (color)} * 8 \text{ (color depth)} * 2 * 4800 \text{ (width of A4 size at 400 DPI)}/8 \approx 10 \text{ MBytes}$$

and density information for one line for gradation.

In the banding processing, since the page buffer 10 has 8-bit data for each color, PDL data from the host computer 1 has normally 1, 2, 4, or 8 bits. For this reason, corresponding 1-, 2-, 4-, or 8-bit Y, M, C and K data are stored as a page object, and bit extension processing is performed via a look-up table upon rendering. This processing requires a very low arithmetic cost as compared to the dither method or the error diffusion method (to be described later).
[Degrade Rendering]

For PDL data which cannot be subjected to band rendering, degrade processing is executed. The flow of color information and the degrade processing sequence as the features of the present invention is described below.

Figure 16:
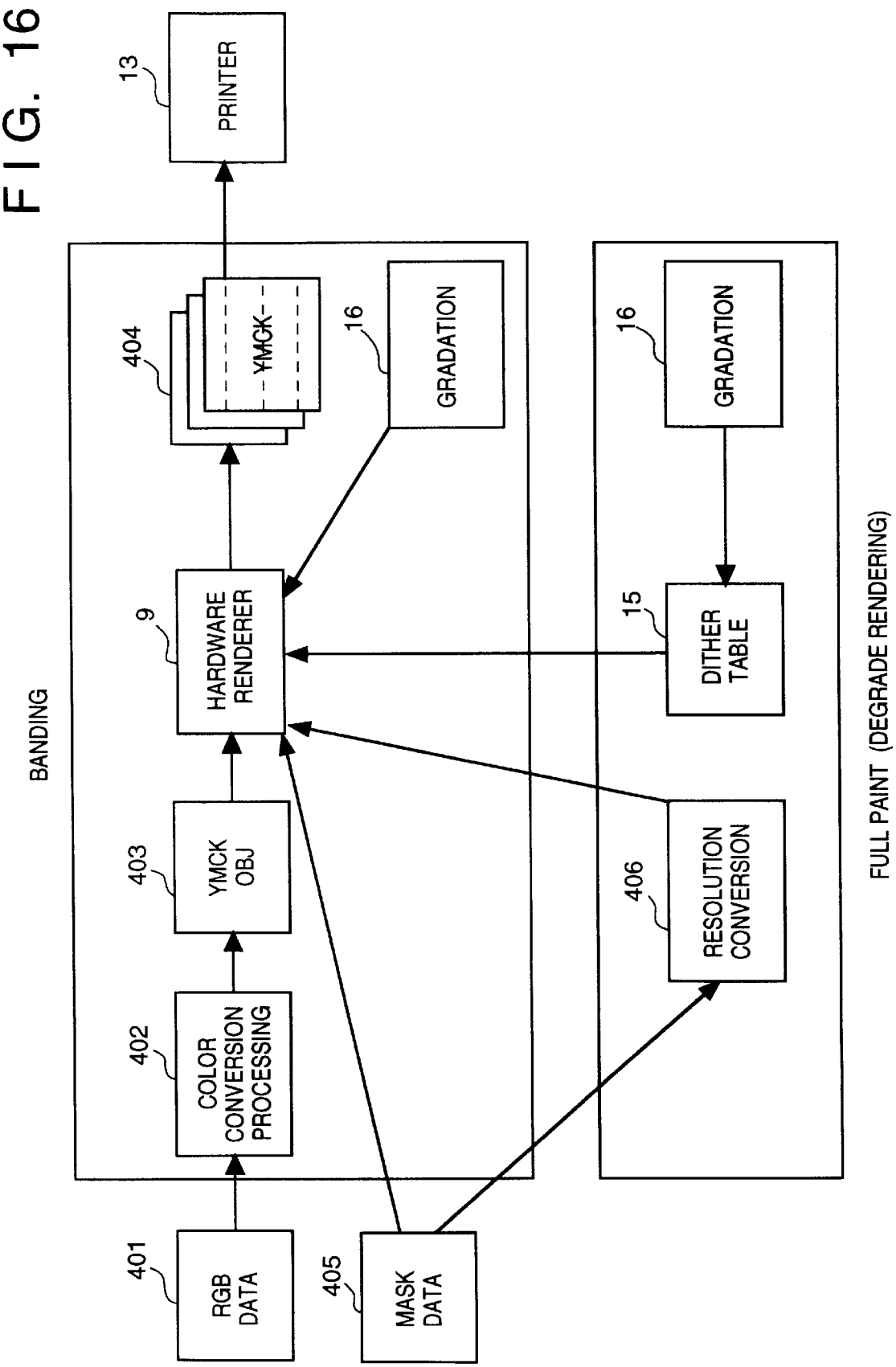
FIG. 16 is a view showing an architecture associated with banding processing and degrade processing.
Figure 17:
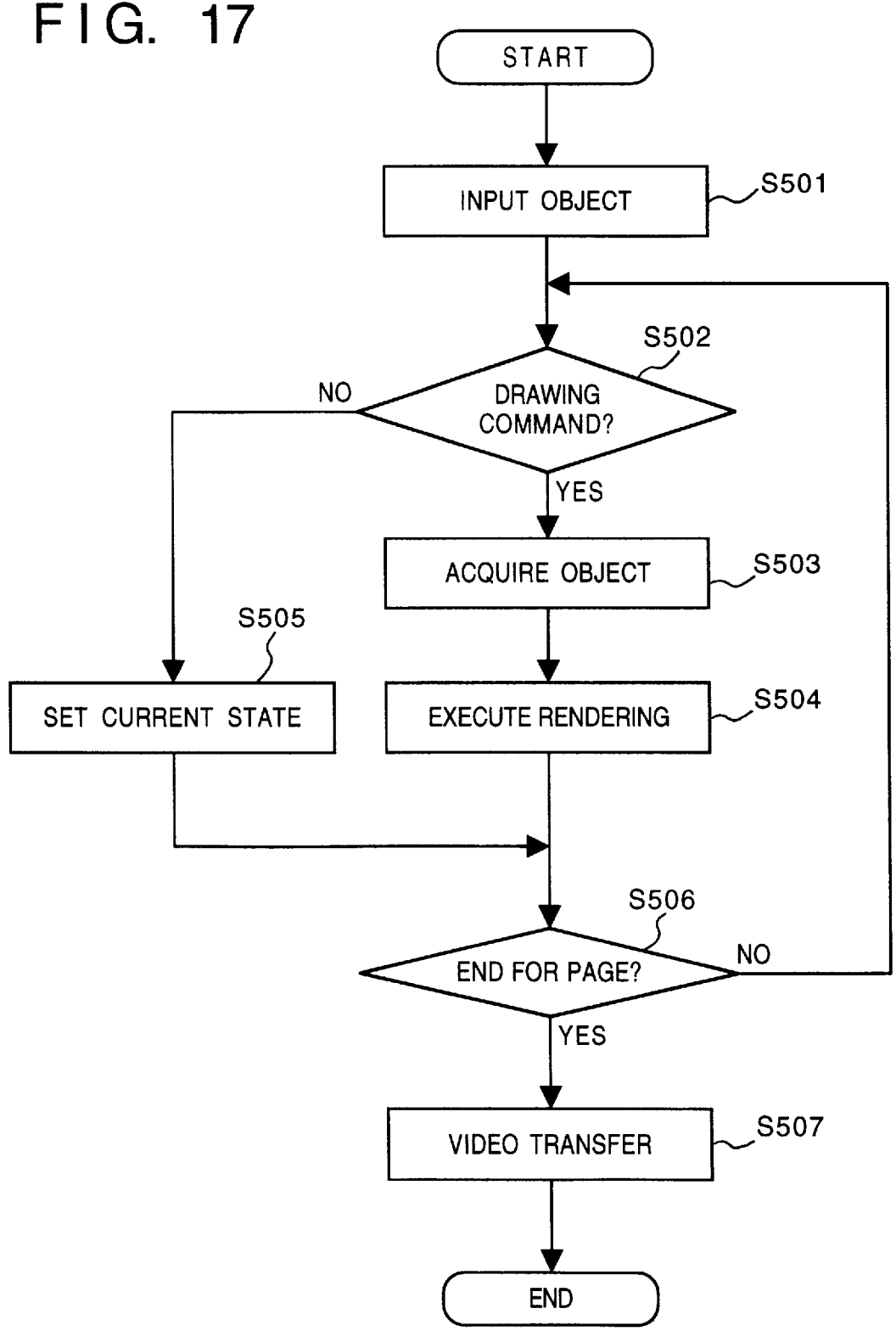
FIG. 17 is a flow chart showing the sequence of the degrade processing.

FIG. 16 shows an architecture associated with banding processing and degrade processing, and FIG. 17 is a flow chart showing the sequence of the degrade processing.
[Resolution Conversion of Page Object]

Since rendering cannot be performed in real time, the degrade processing becomes rendering which is performed on the buffer 10 corresponding to full-bit map data (bit depth=1 2, or 4 bits) whose resolution and/or the number of halftone levels is decreased. The hardware renderer 9 is required to perform simple and high-speed processing, and it cannot execute real-time resolution conversion of run lengths and convex polygon information. For this reason, the following processing must be executed before rendering.

As the pre-processing for rendering, for example, when the resolution is decreased from 600 DPI to 300 DPI, run lengths of two lines are estimated to be one run length, and the vertex information of a convex polygon is re-calculated. This pre-processing is executed for all the mask information in the page buffer by the interpreter task. As for a run length, when the x-coordinates of the start and end points of two lines, i and i+1, at 600 DPI are respectively represented by x1(i), xr(i), x1(i+1), and xr(i+1), one example of the new x-coordinates of the start and end points at 300 DPI is given by:

$$\text{new\_}x1(i)=\min(X1(i), x1(i+1))/2$$

$$\text{new\_}xr(i)=\max(xr(i), xr(i+1))/2$$

and, their y-coordinates are i/2.

As for an image, the image information itself of a page object is left unchanged, and each of the scaling factors in the x-and y-direction is multiplied by ½. When the gradation mode is designated, color information is not corrected, and the reference-position information (x, y) need only be multiplied with ½.

On the other hand, even when the number of halftone levels of the page buffer is decreased, since the renderer supports 1-, 2-, 4-, and 8-bit rendering operations in a hardware or software manner, background information does not particularly need any processing which requires the power of CPU, unlike in mask information.

[Full Paint Rendering]

FIG. 17 is a flow chart showing the algorithm associated with rendering in the degrade mode. In step S501 in FIG. 17, mask information and background information, which are resolution-converted by the interpreter task, are input. In step S502, it is checked if the input object is a drawing command. If the object is not a drawing command, background information and the (logic) drawing mode are substituted in global variables, which hold current information, in step S505.

On the other hand, if it is determined in step S502 that the object is a drawing command, mask information, background information, logic drawing information, and gradation information are acquired in step S503, and rendering is executed (step S504).

The basic algorithm of the gradation (8-bit output) mode has been described. In the degrade processing, since the page buffer has 2 or 4 bits in the worst case, if an 8-bit image or equivalent is input as background information from PDL data, processing such as dither processing, error diffusion processing, or the like for converting the image into 2- or 4-bit data must be executed. For this reason, output result of the gradation becomes an input to dither processing, and is halftone-converted.

[Dither Processing]

The principle of a multi-value dither method is described below with reference to FIGS. 18 to 20. Note that this processing is required when the number of color halftone levels of input data is larger than that of the page memory.

In order to explain the dither processing, the principle of simple multi-value conversion, i.e., an algorithm for converting an 8-bit (256-level) input as multi-value data into 2-bit (four-value) data is described below.

If the input value of the pixel of interest is smaller than 64, 0(00 in 2-bit level) is output; if the input value is equal to or larger than 64 and smaller than 128, 85(01 in 2-bit level) is output; if the input value is equal to or larger than 128 and smaller than 192, 170(10 in 2-bit level) is output; and if the input value is equal to or smaller than 255, 255(11 in 2-bit level) is output.

Figure 18:
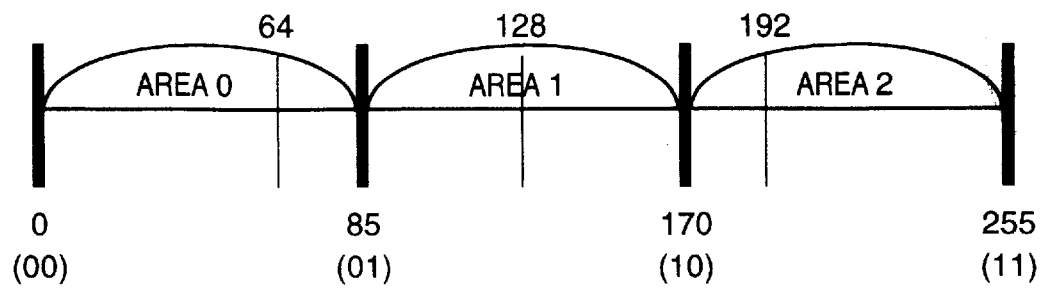
FIG. 18 is a view used for describing a multi-value dither method.

FIG. 18 illustrates the above-mentioned algorithm. In each AREA to which an input belongs, binarization processing is performed by utilizing the threshold value (64, 128, or 192 in this case) of the AREA, so that the output assumes a value at the two ends of the AREA. In FIG. 18, bold vertical lines indicate the division of each area, and output values of 8-bit level and 2-bit level (a value in parentheses in FIG. 18) are shown below each bold line. A thin vertical line indicates a threshold value (8-bit level) in each area.

Figure 19:
FIG. 19 is a view used for describing an application example of binarization processing to the multi-value dither method.
Figure 20:
FIG. 20 is a view used for describing an application example of binarization processing to the multi-value dither method.

FIGS. 19 and 20 are views used for describing an application example of the above-mentioned binarization processing to the multi-value dither method.

A threshold value suitable for an area is calculated on the basis of data of the pixel of interest shown in FIG. 19 and the value of a dither matrix (FIG. 20) corresponding to the pixel of interest, and the data of the pixel of interest is binarized using the calculated threshold value. Note that the dither matrix has a 4×4 pattern, and this pattern is repeated in the x- and y-directions on the page buffer. The maximum value of the dither matrix is 255/(bit level−1). In this embodiment, the bit level is 4. Input data has already been converted to the resolution of the page memory if it is subjected to enlargement or reduction processing.

The actual dither algorithm is explained below.

(1) The pixel of interest in input data is read, and the AREA to which the pixel of interest belongs is determined. In FIG. 19, since the pixel of interest is 180, it belongs to AREA2.

(2) The corresponding dither matrix value is read, and is converted to a threshold value matching the AREA. Then the threshold value is:

$$74+85\times2=244$$

(3) If the data of the pixel of interest is equal to or larger than the threshold value, the maximum value of this AREA is determined as an output value; otherwise, the minimum value of this AREA is determined as an output value.

Since pixel of interest (180)<threshold value (244), the minimum value (170=10 (2 bits)) of AREA2 is output.

(4) The next pixel is processed.

This processing allows high-speed conversion processing using a look-up table in a hardware manner. This table can be realized by storing 2-bit output values which are dither-converted at the respective positions of the 4×4 dither matrix in correspondence with the input levels of 0 to 255.

Figure 21:
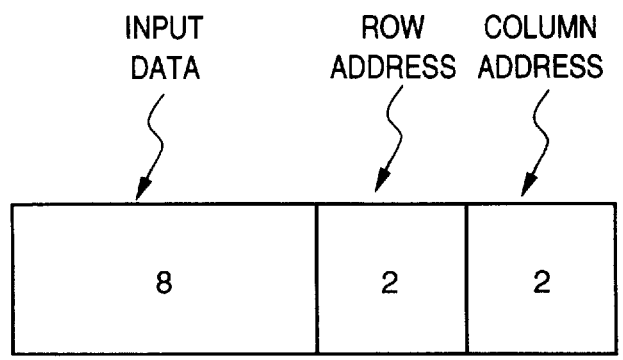
FIG. 21 is a view showing the pointer of a dither table.

This case requires the table size of 256×4×4×2 bits=1024 bytes, in units of Y, M, C, and K colors, and 2 bits of them are accessed from a dither table (FIG. 22) by a pointer shown in FIG. 21.

Referring back to FIG. 17, it is checked in step S506 if rendering processing of mask data for one page is completed. If YES in step S506, rendered data is output to the printer 13 via the printer IF 11 in units of Y, M, C, and K planes, in synchronism with horizontal and vertical synchronization signals (video transfer) (step S507).

[Color Recording Apparatus]

FIG. 23 is a schematic perspective view of a color ink-jet printer (IJRA) as a color printing apparatus according to this embodiment. Note that FIG. 23 also shows the schematic arrangement of the printer 13 shown in FIG. 1.

Referring to FIG. 23, a carriage HC has a pin (not shown) and engages with a spiral groove 5004 of a lead screw 5005, which rotates via driving force transmission gears 5011 and 5009 in synchronism with the forward/reverse rotation of a driving motor 5013. Thus, the carriage HC reciprocally moves in the directions of arrows a and b by the driving motor 5013. An ink-jet cartridge IJC is mounted on the carriage HC.

Reference numeral 5002 denotes a paper pressing plate which presses a paper sheet against a platen 5000 along the moving direction of the carriage. Reference numerals 5007 and 5008 denote photocouplers which constitute home position detection means for confirming the presence of a lever 5006 of the carriage in the region of the photocouplers 5007 and 5008, and switching the direction of rotation of the motor 5013.

Reference numeral 5016 denotes a cap member for capping the entire surface of a recording head; and 5015, suction means for drawing the interior of the cap by suction. The suction means 5015 performs suction recovery of the recording head via an intra-cap opening 5023. Reference numeral 5017 denotes a cleaning blade. The suction means 5015 allows this blade to move in the back-and-forth direction. These members are supported on a main body support plate 5018. Note that the blade 5017 is not limited to the one illustrated in FIG. 23, but a known cleaning blade can be applied, as a matter of course.

Reference numeral 5012 denotes a lever for starting the suction operation of the suction recovery. The lever 5012 moves upon movement of a cam 5020 engaging with the carriage, and its movement is controlled by known transmission means such as clutch switching on the basis of the driving force from the driving motor 5013.

These capping, cleaning, and suction recovery are performed at corresponding positions upon operation of the lead screw 5005 when the carriage reaches the region on the home position side, but may be performed at other timings.

As described above, the gradation function as color information is designated using PDL data, and only PDL data required for the gradation function is supplied to the printer to execute the gradation function in the printer. In this manner, a large amount of image data need not be transferred between the host computer and the printer, thus realizing high-speed rendering and high printing throughput.

Since an image is supplied as gradation information by the gradation function defined by PDL data, the driver of the host computer need not perform resolution interpolation.

Furthermore, in the degrade mode, since the dither processing can be applied to the gradation function, an output corresponding to the color depth can be obtained.

In this embodiment, in the degrade processing, the dither processing is performed for the gradation processing result. However, the present invention is not limited to this. For example, as in the banding processing, rendering can be performed by using input data as is or by discarding some bits.

As a result, in particular, upon execution of software processing, though the print quality of a gradation pattern may be somewhat impaired, print processing can be attained at higher speed than the dither processing. Therefore, a user can take such processing as a draft mode. In this mode, in the degrade processing, the processing in a resolution conversion block 406 is executed but the dither table 15 is not looked up. Thus, the gradation output is input to the hardware renderer 9.

In the above embodiment, the dither processing has been exemplified as pseudo-halftone processing for assuring color accuracy in the degrade processing. However, the present invention is not limited to this processing. For example, processing of the error diffusion method, the average-density preservation method, or the like may be applied.

Furthermore, in the above embodiment, the explanation has been given under the assumption that the number of halftone levels is decreased in the degrade processing. However, if a user can extend a page memory as an extended RAM, and a full memory for 256-halftone levels can be assured, pseudo-halftone conversion processing based on the dither processing need not be performed in the degrade processing.

As described above, according to the present invention, since the gradation function is realized in the printer, the transfer amount of image data between the host computer and the printer can be reduced, and the printing throughput can be improved.

According to another invention, since the dither processing is applied to the gradation function in the degrade processing, an output corresponding to the color depth can be obtained.

In the present invention, the intermediate information is not limited to a page object format, but may be any other information as long as it represents an image before rendering.

The present invention can be applied to a system constituted by a plurality of devices or to an apparatus comprising a single device.

Furthermore, the invention is applicable also to a case where the invention is embodied by supplying a program to a system or apparatus. In this case, a storage medium, storing a program according to the invention constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for an image forming apparatus which forms an image on the basis of color page-description information input from an external apparatus, comprising:

input means for inputting the color page-description information from the external apparatus, the information representing the image and including gradation information which instructs generation of a gradation image;

intermediate information generation means for generating predetermined intermediate information on the basis of the color page-description information;

interpretation means for interpreting the gradation information and performing calculating processing based on the interpretation result so as to generate gradation image data; and rendering means for rendering the image data which includes the generated gradation image data, on the basis of the intermediate information and the interpretation result.

2. The apparatus according to claim 1, further comprising means for generating and storing information representing the gradation image on the basis of the interpretation result, wherein said rendering means refers to the information representing the gradation image.

3. The apparatus according to claim 1, wherein the gradation information includes a type of gradation processing, positions of a plurality of points, and color-density information at each of said points.

4. The apparatus according to claim 3, wherein the type of gradation processing includes one of a linear-gradation pattern between two points, a circular-gradation pattern having one point as the center and the other point as a point on an outermost circumference, and a triangular-gradation pattern upon designation of three points.

5. The apparatus according to claim 3, wherein the gradation information includes information for designating sections to be divided with equal density.

6. The apparatus according to claim 1, further comprising determination means for determining, before the rendering processing, whether or not band rendering processing of the color page-description information is possible, wherein when it is determined that the band rendering processing is impossible, a full bit-map memory is assured, and thereafter, degrade processing for performing rendering processing with a corresponding number of color halftone-levels is applied.

7. The apparatus according to claim 6, wherein the degrade processing is processing for reproducing color accuracy of the gradation image by decreasing one or both of a resolution of printing and the number of halftone-levels.

8. The apparatus according to claim 6, further comprising selection means for selecting one of rendering processing based on the number of color halftone-levels corresponding to dither processing and rendering processing based on simple color-mapping to a corresponding number of color halftone-levels, in the degrade processing.

9. An image processing method in an image forming apparatus which forms an image on the basis of color page-description information input from an external apparatus, comprising the steps of:

inputting the color page-description information from the external apparatus, the information representing the image and including gradation information which instructs generation of a gradation image;

generating predetermined intermediate information on the basis of the color page-description information;

interpreting the gradation information;

performing calculating processing based on the interpretation result so as to generate gradation image data; and rendering the image data which includes the generated gradation image data, on the basis of the intermediate information and the interpretation result.

10. A computer program product comprising a computer-usable medium having computer-readable program code means embodies in said medium for an image processing method in an image forming apparatus which forms an image on the basis of color page-description information input from an external apparatus, said product comprising:

first computer-readable program code means for inputting the color page-description information from the external apparatus, said information representing the image an including gradation information which instructs generation of a gradation image;

second computer-readable program code means for interpreting the gradation information;

third computer-readable program code means for performing calculating processing based on the interpretation result so as to generate gradation image data; and fourth computer-readable program code mans for rendering the image data which includes the generated gradation image data, on the basis of the color page-description information and the interpretation result.

11. An image processing apparatus for an image forming apparatus which forms an image on the basis of color page-description information input from an external apparatus, comprising:

input means for inputting the color page-description information from the external apparatus, said information representing the image and including gradation information which instructs generation of a gradation image;

interpretation means for interpreting the gradation information and performing calculating processing based on the interpretation result so as to generate gradation image data; and rendering means for rendering the image data which includes the generated gradation image data, on the basis of the color page-description information and the interpretation result.

12. The apparatus according to claim 11, said image forming apparatus comprising image forming means for forming an image based on the rendered image data.

13. An image processing method in an image forming apparatus which forms an image on the basis of color page-description information input from an external apparatus, comprising the steps of:

inputting the color page-description information from the external apparatus, the information representing the image and including gradation information which instructs generation of a gradation image;

interpreting the gradation information;

performing calculating processing based on the interpretation result so as to generate gradation image data; and rendering the image data which includes the generated gradation image data, on the basis of the color page-description information and the interpretation result.

14. The apparatus according to claim 1, said image forming apparatus comprising image forming means for forming an image based on the rendered image data.

15. A computer program product comprising a computer readable medium having computer program code, for executing an image processing in an image forming apparatus which forms an image on the basis of color page-description information input from an external apparatus, said product comprising:

input process procedure code for inputting the color page-description information from the external apparatus, the information representing the image and including gradation information which instructs generation of a gradation image;

generation process procedure code for generating predetermined intermediate information on the basis of the color page-description information;

interpretation process procedure code for interpreting the gradation information;

calculation process procedure code for performing calculating processing based on the interpretation result so as to generate gradation image data; and rendering process procedure code for rendering the image data which includes the generated gradation image data, on the basis of the intermediate information and the interpretation result.

* * * * *

UNITED STATES PATENT AND TRADEMARK OFFICE
CERTIFICATE OF CORRECTION

PATENT NO. : 5,852,679

DATED : December 22, 1998

INVENTOR(S): HARUO SHIMIZU

It is certified that error appears in the above-identified patent and that said Letters Patent is hereby corrected as shown below:

ON TITLE PAGE

[56] OTHER PUBLICATIONS

Delete "Unda: First of a New Generation......0763-2260

IN THE DRAWINGS

Sheet 2 of 18, Fig. 2 "DEGRAGE" should read --DEGRADE--.

COLUMN 1

| | |
|---|---|
| line 13, | "figures," should read --figures--; |
| line 18, | "range" should read --range of--; |
| line 22, | "image," should read --image--; |
| line 35, | "character figure," should read --character, figure--; |
| line 45, | "printers," (2nd occurrence) should read --printers--; |
| line 46, | "like" should read --like,--; |
| line 47, | "C," should read --C--; and |
| line 56, | "C," should read --C--. |

COLUMN 2 line 1,    "PCL," should read --PCL--.

COLUMN 3 line 62,   "ROM a RAM," should read --ROM, a RAM--.

UNITED STATES PATENT AND TRADEMARK OFFICE
CERTIFICATE OF CORRECTION

PATENT NO. : 5,852,679

DATED : December 22, 1998

INVENTOR(S): HARUO SHIMIZU

It is certified that error appears in the above-identified patent and that said Letters Patent is hereby corrected as shown below:

<u>COLUMN 4</u> line 2,   "convert" should read --converts--;
   line 11, "operation," should read --operation--; and
   line 59,  "of" should be deleted.

<u>COLUMN 5</u> line 39, "ADD," should read --ADD--.

<u>COLUMN 6</u> line 43, "to time" should read --to the time--.

<u>COLUMN 7</u> line 15, "tile," should read --tile--.

<u>COLUMN 8</u> line 9,   "C," should read --C-- and "planes" should read --planes,--; and
   line 29, "MC," should read --M,C--.

UNITED STATES PATENT AND TRADEMARK OFFICE
CERTIFICATE OF CORRECTION

PATENT NO.   : 5,852,679

DATED        : December 22, 1998

INVENTOR(S) : HARUO SHIMIZU

It is certified that error appears in the above-identified patent and that said Letters Patent is hereby corrected as shown below:

COLUMN 9 line 34,   "DAVID," should read --DAVID--.

COLUMN 10 line 12,   "even" should read --even when--.

COLUMN 13 line 7,    "recovery" should read --recovery operations--.

COLUMN 15 line 23,   "embodies" should read --embodied--;
  line 30,   "an" should read --and--; and
  line 37,   "mans" should read --means--.

Signed and Sealed this

Twenty-eighth Day of September, 1999

*Attest:*

Q. TODD DICKINSON

*Attesting Officer*      *Acting Commissioner of Patents and Trademarks*